(12) United States Patent
Mallet

(10) Patent No.: US 8,585,905 B2
(45) Date of Patent: Nov. 19, 2013

(54) DEVICES, KITS AND METHODS FOR PERFORMING CHEMICAL PROCESSING

(75) Inventor: Claude R. Mallet, Attleboro, MA (US)

(73) Assignee: Waters Technologies Corporation, Milford, MA (US)

( * ) Notice: Subject to any disclaimer, the term of this patent is extended or adjusted under 35 U.S.C. 154(b) by 291 days.

(21) Appl. No.: 13/036,146

(22) Filed: Feb. 28, 2011

(65) Prior Publication Data

US 2012/0048002 A1   Mar. 1, 2012

Related U.S. Application Data

(60) Provisional application No. 61/308,623, filed on Feb. 26, 2010.

(51) Int. Cl.
*B01D 15/20* (2006.01)
*B01D 15/22* (2006.01)

(52) U.S. Cl.
USPC ............................ 210/661; 210/656; 210/679

(58) Field of Classification Search
USPC ........... 137/798; 210/477–479, 656, 661, 679
See application file for complete search history.

(56) References Cited

U.S. PATENT DOCUMENTS

| | | | | |
|---|---|---|---|---|
| 2,775,350 A * | 12/1956 | Jones | ............................. | 210/446 |
| 3,701,434 A * | 10/1972 | Moore | ......................... | 210/477 |
| 3,788,483 A * | 1/1974 | Conway | ..................... | 210/416.1 |
| 5,472,025 A * | 12/1995 | Conrad et al. | ................ | 141/332 |
| 5,501,841 A * | 3/1996 | Lee et al. | ....................... | 422/506 |
| 5,925,250 A * | 7/1999 | Rocha | .......................... | 210/436 |
| 6,599,754 B2 * | 7/2003 | Miller et al. | ................... | 436/178 |
| 6,910,720 B2 * | 6/2005 | Shimei et al. | ................. | 285/331 |
| 7,069,739 B2 * | 7/2006 | Porter | ........................ | 62/457.3 |
| 7,176,034 B2 * | 2/2007 | Efthimiadis et al. | ........... | 436/177 |
| 8,197,771 B2 * | 6/2012 | Maiden | ......................... | 422/501 |
| 2009/0001722 A1 * | 1/2009 | Yoshihiro et al. | ........... | 285/382.2 |
| 2011/0011494 A1 * | 1/2011 | Muhlhausen et al. | ........ | 141/331 |
| 2012/0037252 A1 * | 2/2012 | Stephan | ........................ | 137/798 |

* cited by examiner

*Primary Examiner* — David A Rogers
(74) *Attorney, Agent, or Firm* — Waters Technologies Corporation

(57) ABSTRACT

Embodiment of the present invention features a device, method and kit for performing one or more processing steps on a sample. The device includes a housing and a processing component. The housing has a first vessel connector for receiving a first vessel and a second vessel connector for receiving a second vessel, and a passage, to provide fluid communication between the first and second vessels. The processing component is in fluid communication with the passage and for effecting a change in a fluid moving from the first vessel to the second vessel through the passage via centrifugal force.

26 Claims, 3 Drawing Sheets

DEVICES, KITS AND METHODS FOR PERFORMING CHEMICAL PROCESSING

RELATED APPLICATIONS

This application claims priority to U.S. Provisional Application No. 61/308,623 entitled "Devices, Kits and Methods for Performing Chemical Processing" filed on 26 Feb. 2010, the entire contents of which are incorporated herein by reference.

FIELD OF THE INVENTION

The present invention is directed to a device, kit and method for performing chemical processing. And, in particular, embodiments of the present invention feature devices, kits and methods for separating compounds and solids held in solution or suspended in fluids from other constituents.

BACKGROUND OF THE INVENTION

An analytical procedure for analyzing a sample mixture requires sample preparation, which transforms a sample from its raw state into an ideal format for subsequent analysis using analytical techniques, such as high performance liquid chromatography (HPLC), ultra high pressure liquid chromatography (UPLC), HPLC or UPLC coupled with mass spectrometry (MS) or tandem mass spectrometry (MSMS), or gas chromatography (GC) coupled with MS or MSMS.

The term "sample" used in this application refers to any mixture or suspension or solid which an individual desires to analyze. The term "mixture" is used in the sense of a fluid containing one or more compounds of interest and unwanted interferences. The term "suspension" refers to a fluid in which particles or solids are held. The fluid may comprise water and/or other liquids and gases. A compound of interest is referred to as an analyte. The term "sample preparation" used herein refers to a process which involves a series of steps to extract or isolate analytes or compounds of interest from a sample mixture.

There are many extraction techniques such as centrifugal separation, filtration, liquid-liquid extraction, solid phase extraction, etc. Among them solid phase extraction (SPE) is one of most widely used sample preparation techniques for last two decades.

A SPE device typically comprises filters for filtration and separation media for chromatography. The term "filter" refers in the broadest sense to any device containing a porous material which can remove or block particles or solids held in a sample mixture or suspension passing through the device. For example, without limitation, a filter can be a membrane, a screen, or a frit. The term "separation media" refers to particles, porous monolith materials, and the like known in the art.

A SPE process typically involves steps of filtration and chromatography. Filtration and chromatography are separation methods for extracting or isolating one or more compounds or solids found in a mixture.

Filtration separates or isolates materials due to size. Particles and solids which have size dimensions which exceed the size of pores, channels, passages or openings of filters such as screens, frits, membranes and the like will not pass through.

Chromatography separates or isolates compounds due to the differences in affinity one compound has to the mixture in which it is dissolved and to another phase as the mixture and the other phase move in relationship to each other. Normally the mixture, sometimes referred to as the mobile phase, moves in relationship to a packed bed of particles or a porous monolith structure, referred to as the stationary phase.

Though SPE is viewed as one of most efficient, time-saving, and dynamic sample preparation techniques for decades, depending upon sample complexity, a SPE process can take from a few minutes to several hours. Further, a typical SPE process involves transferring a sample material from one container to another a number of times; this obviously increases the chance of losing analytes in a sample and thus sacrifices sensitivity.

It would be desirable to have a standardized SPE device and a standardized SPE method, by which a sample preparation process from beginning to end can be carried out in one place or container, such that less time is required to transform a raw sample from its original state to an ideal format, and such that less samples amount is required to achieve the same level of sensitivity.

It would also be desirable to use existing common laboratory equipments to effect sophisticated separations based on the affinity for or against a solid phase separation media or filters to isolate low concentration analytes from large volumes of solution.

SUMMARY OF THE INVENTION

The present invention is directed to a device, kit and method for performing chemical processing on a sample. More particularly, the present invention relates to a device and a method for transforming a sample from its raw state into an ideal format for subsequent analysis. Embodiments of the present invention use existing common laboratory equipments to effect sophisticated separations based on the affinity for or against a solid phase separation media or filters to isolate analytes from a sample mixture containing unwanted interferences.

One embodiment of the present invention is directed to a device for performing one or more chemical processing steps on a sample held in a first vessel. The device has a housing and a processing component. The housing has a first vessel connector, a second vessel connector, and a passage. The first vessel connector is for receiving a first vessel and the second vessel connector is for receiving a second vessel. With the first vessel and the second vessel received on the first vessel connector and the second vessel connector respectively, the first and second vessels are in fluid communication via the passage. The processing component is in fluid communication with the passage and for effecting a change in a fluid moving through the passage to form at least one processed fluid. The processing component includes a first filter and a second filter, and a passage chamber, which optionally holds a separation medium, e.g. a bed of particles between the first filter and the second filter. Fluid moving from the first vessel through the processing component and the passage forms at least one processed fluid entering the second vessel via centrifugal force.

The term "effecting a change in a fluid", used in this application, refers to any processing steps applied to a sample mixture, for example, extraction or/and separation, which results in isolation of compounds of interest from the sample mixture and removal of any unwanted interferences.

The term "processed fluid", used in this application, refers to any sample or sample mixture which has gone through one or more processing steps, for example, extraction or/and separation steps.

The housing of the claimed device can be made of any suitable structurally rigid material such as plastic, steel, aluminum, brass, glass, and the like. Plastic housings are generally inexpensive to mold and can facilitate laboratory efficiency through one-time use. A preferred housing is cylindrical in shape. One embodiment of the present invention features a double-end cap housing having an overall length of 2.8 cm, which fits the neck portion of any sample vial in use.

Another embodiment of the present invention features a housing having an interior wall tapered from wide to narrow in the direction toward to the second vessel connector of the housing.

Embodiments of the present invention are ideally suited for use with standard laboratory vessels such as vials, tubes, beakers, flasks, and bottles, which can serve as first vessels or second vessels. A preferred housing is cylindrical in shape and receives a standard 20 mL vial. The 20 mL vial used in the embodiments of the present invention is produced by Waters Corporation, which has an outer diameter of approximately 2.5 cm and a height of approximately 5.8 cm, however, other commercial sample vials or bottles of similar or different dimensions can also be used, e.g., 10 mL vials, 2 nL vials, etc. Adapters can be used for attaching vials or bottles of different sizes and shapes to the housing.

The first vessel connector and second vessel connector may receive identical type vessels preferably standard laboratory vials. A preferred first vessel connector and second vessel connector are selected from the group comprising cooperating threads, tightly fitted lips and locking flanges, and cinching bands. A preferred vessel has threads about the top of the vial proximal to the vial opening. One embodiment of the present invention features at least one first connector and second connector having cooperating threads.

Embodiments of the present invention are ideally suited to use common laboratory equipment to process samples. For example, the centrifugal force is, preferably, applied by a standard centrifuge. A preferred centrifuge is a benchtop centrifuge.

Embodiments of the present invention feature a processing component selected from one or more of the group comprising filters, beds of particles, and porous monolith separation media. The filters can be membranes, screens, or frits. In one embodiment of the present invention, the filters are implemented as membranes of 2 µm in thickness. The membranes can be either disk-shaped or ball-shaped and have a pore size ranging from coarse, medium, to fine.

A preferred processing component is held in the passage by releasable securing means. That is, the filter, or particle bed or monolith porous media is formed as a cartridge and can be used, removed from the housing and replaced as needed. For example, without limitation, the processing component formed as a cartridge has at least one securing surface and the passage has at least one passage wall. One releasable securing means comprises a press fit of the securing surface with the at least one passage wall. Or, the processing component formed as a cartridge has at least one processing rim surface constructed and arranged to abut and seal against a co-operating lip of a containment vessel or a rim in the passage.

The bed of particles or monolith separation media of the processing component are functionalized for specialized functions processes or methods. For example, one embodiment features the bed of particles or monolith separation media having ion exchange functional groups, aliphatic chains to promote hydrophobic affinity or polar groups to favor hydrophilic or catalytic interactions. The bed of particles comprises a sorbent material selected from a group comprising silica, silica-C18, Oasis, polymer, reversed phase, ion exchanger, and carbon. A further embodiment features screens, filters papers, membranes made of compositions which favor polar versus non-polar interactions or flow or having ion exchange groups. For the purpose of this application, the term screen shall refer to metallic screens and fabrics. Screens can be coated with fluorocarbon polymer, e.g. TEFLON® polymer, a brand name of Dupont Corporation, Delaware, USA, or made of GORE-TEX® polymer, a brand name of W. L. Gore & Associates, Inc, Maryland, USA. These materials are chosen to promote or discourage passage of sample constituents through the processing component. For example, the choice may encourage the passage or retention of proteins, peptides, glycoproteins, cellulose, poorly solubilized compounds, nucleic acids, and other compounds of interest from each other and from the solutions in which such are dissolved or suspended.

Embodiments of the present invention can be made compact to accommodate different centrifuges. For example, one embodiment, wherein at least one of the first vessel and a second vessel has a interior volume, features a passage which extends into the interior volume to form a passage chamber. A preferred passage chamber has a first end and a second end and at least one wall. The at least one wall is constructed and arranged to hold a first filter at the first end and at least a second filter at the second end. The passage chamber holds a bed of particles between the first filter and the second filter. Or, the passage chamber holds a monolith separation media.

A further embodiment of the present invention is directed to a method of forming at least one processed fluid from a sample. The method comprises the steps of first placing a sample solution in a first vessel. Next, the method comprises the step of placing a device having a housing and a processing component on the first vessel. The housing has a first vessel connector for receiving a first vessel and a second vessel connector for receiving a second vessel, and a passage. The first vessel and the second vessel received on the first vessel connector and the second vessel connector respectively are in fluid communication via the passage. The processing component is for effecting a change in at least one fluid moving through the passage to form at least one processed fluid. The method further comprises the step of placing a second vessel on the device at the second vessel connector to form a first and second vessel housing assembly. Preferably, the first and second vessel housing assembly is flipped before being placed in a centrifuge such that the first vessel is on top of the housing assembly and the second vessel is on bottom of the housing assembly. The method then places the first and second vessel housing assembly into a centrifuge and operates the centrifuge to form at least one processed fluid. The sample is centrifuged preferably for fifteen minutes at a speed of 3500 rpm; those numbers can be modified or optimized depending on the type and complexity of a sample.

A further embodiment of the present invention is directed to a kit for performing one or more chemical processing steps on a sample held in a first vessel. The kit comprises a device having a housing having a first vessel connector, a second vessel connector, and a passage. The first vessel connector is for receiving a first vessel and the second vessel connector is for receiving a second vessel. The first vessel and the second vessel received on the first vessel connector and the second vessel connector respectively are in fluid communication via the passage. The kit further comprises one or more processing components for being placed in fluid communication with the passage. The processing component is for effecting a change in at least one fluid moving through the passage to form at least one processed fluid. The first vessel is for receiving a first fluid and is connected to the housing via the first vessel connector, and the second vessel is for receiving a processed fluid from the passage and is connected to the housing via the second vessel connector. Fluid moving from the first vessel through the processing component and the passage into the second vessel forms a processed fluid via centrifugal force.

The term "kit" is used for a group of components, articles of manufacture, reagents, and/or instructions for their use packaged or bundled together for use in a method. A preferred kit comprises a plurality of processing components. A preferred processing component is a cartridge secured into the passage.

These and other features and advantages will be apparent to those skilled in the art upon reading the detailed description that follows and viewing the Figures summarized below.

DETAILED DESCRIPTION OF THE INVENTION

The present invention will now be described with respect to FIGS. 1-5, with the understanding that the figures and their descriptions are directed to the preferred embodiments of the present invention. Those skilled in the art will recognize that such preferred embodiments are capable of modification and alteration without departing from the teaching of the present disclosure.

Figure 1:
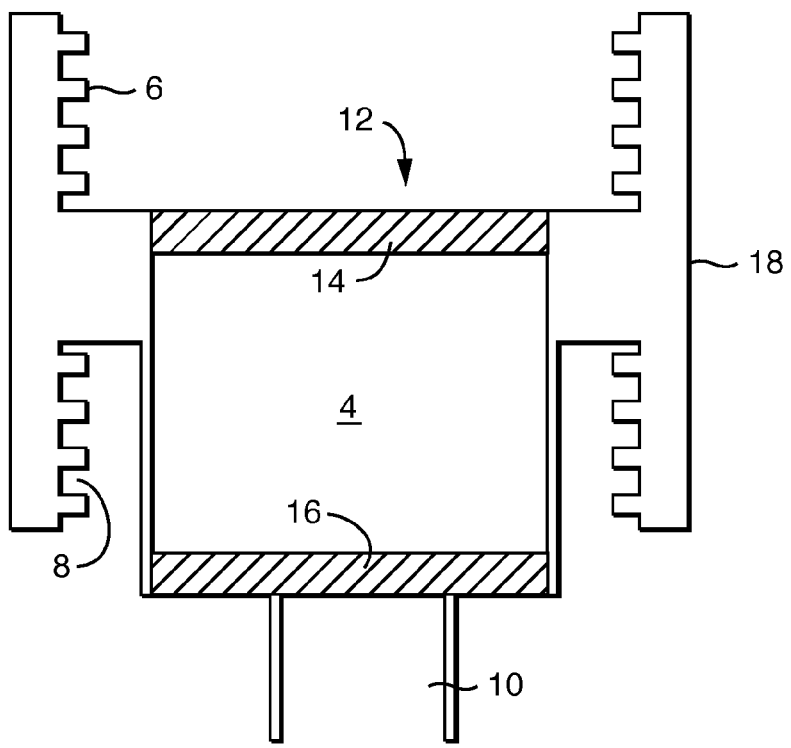
FIG. 1 is a schematic representation of a preferred embodiment of the device made in accordance with the present invention.

Referring to FIG. 1, a schematic representation of a preferred embodiment of the device 20 made in accordance with the present invention is shown. The device 20 has a housing 18 and a processing component 12 including a first filter 14 and a second filter 16, and a passage chamber 4, which optionally holds a separation medium, e.g., a bed of particles, between the first filter 14 and the second filter 16. The housing 18 has a first vessel connector 6, a second vessel connector 8, and a passage 10. The first vessel connector 6 is for receiving a first vessel and the second vessel connector 8 is for receiving a second vessel. With the first vessel and the second vessel received on the first vessel connector 6 and the second vessel connector 8 respectively, the first and second vessels are in fluid communication via the passage 10. The processing component 12 is in fluid communication with the passage 10 and for effecting a change in at least one fluid moving through the passage 10 to form at least one processed fluid. The first vessel connected to the housing 18 via the first vessel connector 6 is for receiving a first fluid and the second vessel connected to the housing 18 via the second vessel connector 8 is for receiving a processed fluid from the passage 10. Fluid moving from the first vessel through the passage 10 and the processing component 12 forms at least one processed fluid entering the second vessel via centrifugal force.

In the embodiment of the present invention illustrated in FIG. 1, the first vessel connector 6 and a second vessel connector 8, each has an interior volume, feature a passage which extends into the interior volume of the passage chamber 4 holding a separation medium in between the first filter 14 and the second filter 16. The filters 14 and 16 can be membranes, screens, or frits. In the embodiment of the present invention shown in FIG. 1, the filters 14 and 16 are implemented as disk-shaped membranes of 2 μm in thickness.

The housing 18 can be made of any suitable structurally rigid material such as plastic, steel, aluminum, brass, glass, and the like. Plastic housings are generally inexpensive to mold and can facilitate laboratory efficiency through one-time use. The device 20 is ideally suited for use with standard laboratory vessels such as vials, tubes, beakers, flasks, and bottles, which can serve as first vessels or second vessels. A preferred housing is cylindrical in shape and receives a standard 20 mL vial.

The first vessel connector 6 and second vessel connector 8 may receive identical type vessels preferably standard laboratory vials, e.g. a standard 20 mL vial. A preferred first vessel connector 6 and second vessel connector 8 are selected from the group comprising cooperating threads, tightly fitted lips and locking flanges, and cinching bands. A preferred vessel has threads about the top of the vial proximal to the vial opening. The embodiment of the present invention shown in FIG. 1 features the first vessel connector 6 and the second vessel connector 8 having cooperating threads.

The device 20 is ideally suited to use common laboratory equipment to process samples. For example, the centrifugal force is, preferably, applied by a standard centrifuge. A preferred centrifuge is a benchtop centrifuge that receives a standard 20 mL vial.

The bed of particles or monolith separation media, held in the passage chamber 4, is functionalized for specialized functions processes or methods. For example, one embodiment features the bed of particles or monolith separation media having ion exchange functional groups, aliphatic chains to promote hydrophobic affinity or polar groups to favor hydrophilic or catalytic interactions. The bed of particles comprises a sorbent material selected from a group comprising silica, silica-C18, Oasis, polymer, reversed phase, ion exchanger, and carbon. A further embodiment features screens, filters papers, membranes made of compositions which favor polar versus non-polar interactions or flow or having ion exchange groups. For the purpose of this application, the term screen shall refer to metallic screens and fabrics. Screens can be coated with fluorocarbon polymer, e.g. TEFLON® polymer, a brand name of Dupont Corporation, Delaware, USA, or made of GORE-TEX® polymer, a brand name of W. L. Gore & Associates, Inc, Maryland, USA. These materials are chosen to promote or discourage passage of sample constituents through the processing component 12. For example, the choice may encourage the passage or retention of proteins, peptides, glycoproteins, cellulose, poorly solubilized compounds, nucleic acids, and other compounds of interest from each other and from the solutions in which such are dissolved or suspended.

Figure 2:
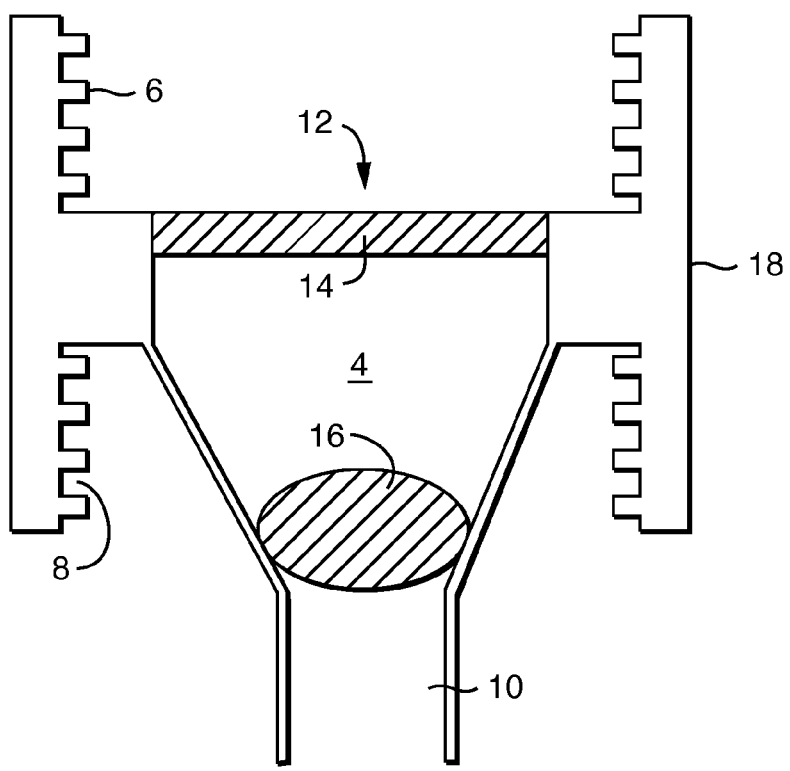
FIG. 2 is an alternate preferred embodiment of the device as shown in FIG. 1.

FIG. 2 is an alternate preferred embodiment of the device 20 as shown in FIG. 1. In this embodiment, the device 20 comprises an inner tapered wall having a first end with a wider interior diameter toward to the first vessel connector 6 of the housing 18 and a second end with a smaller interior diameter toward to the second vessel connector 8 of the housing 20. The first filter 14 of disk-shaped is mounted flush to the first end of the inner tapered wall and the second filter 16 of ball-shaped mounted flush to the second end of the inner tapered wall of the housing 18.

Figure 3:
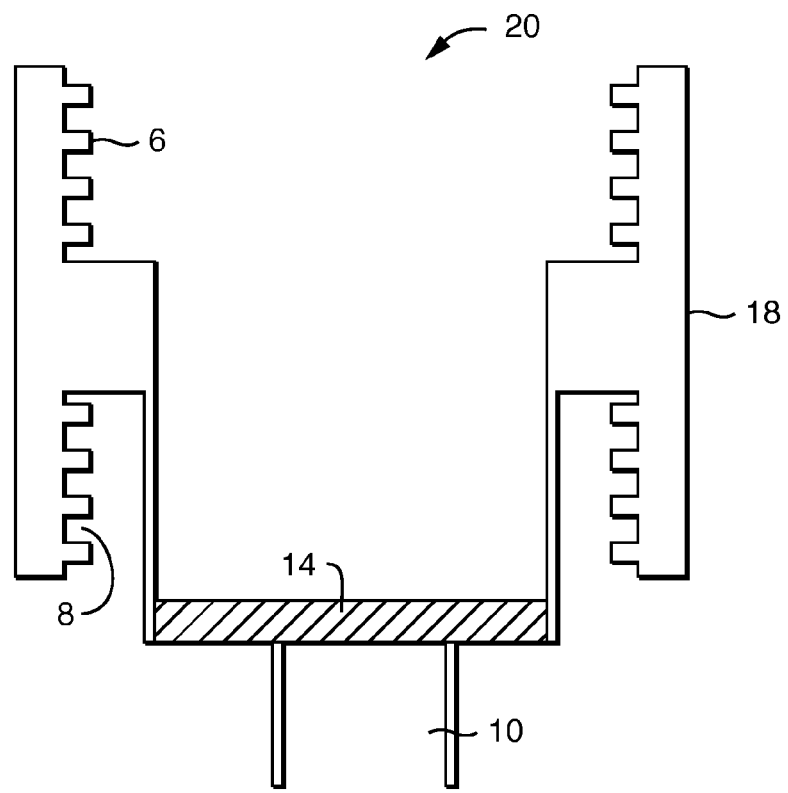
FIG. 3 is another embodiment of the device made in accordance with the present invention.

FIG. 3 is another embodiment of the device made in accordance with the present invention. In this embodiment, the device 20 comprises a single filer 14 toward to the second vessel connector 8 of the housing 18.

Figures 4A, 4B, 4C, 4D, 4E:
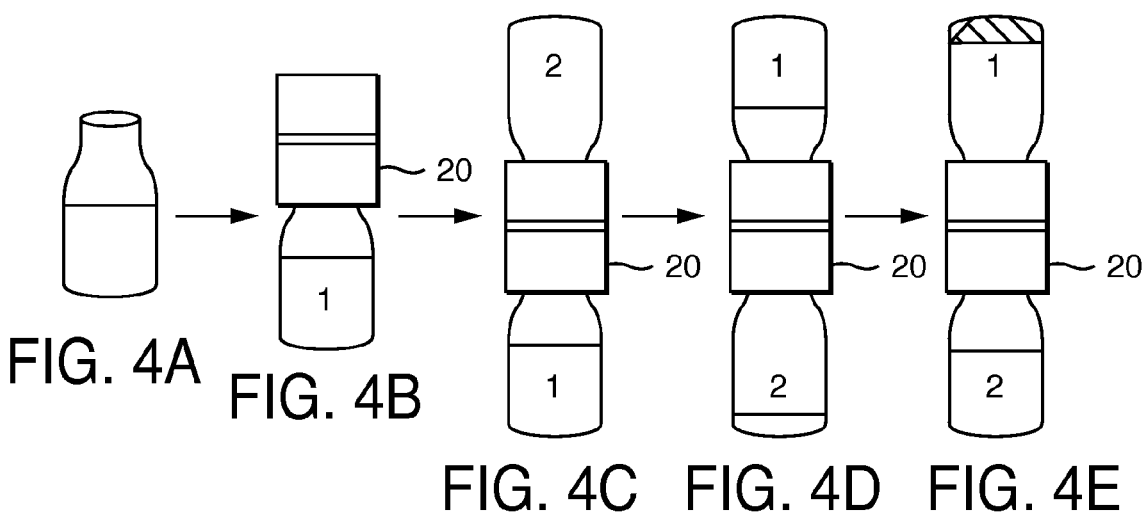
FIGS. 4A-4E are schematic representations illustrating the method for performing chemical processing on a sample using the device of the present invention.

FIGS. 4A-4E are directed to a method for performing chemical processing on a sample using the device of the present invention. The method comprises the steps of first placing the sample solution in a first vessel 1 (FIG. 4A). Next, the method comprises the step of placing a device 20 having a housing (not shown) and a processing component (not shown) on the first vessel 1 (FIG. 4B). The housing has a first vessel connector (not shown) for receiving a first vessel, a second vessel connector (not shown) for receiving a second vessel 2, and a passage (not shown). The method further comprises the step of placing a second vessel 2 on the device 20 at the second vessel connector to form a first and second vessel housing assembly (FIG. 4C). The first vessel 1 and the second vessel 2 received on the first vessel connector 6 and the second vessel connector 8 respectively are in fluid communication via the passage defined by the housing. The processing component is in fluid communication with the passage for effecting a change in at least one fluid moving through the passage to form at least one processed fluid. The first and second vessel housing assembly is flipped before being placed in a centrifuge such that the first vessel 1 is on top of the housing assembly and the second vessel 2 is on bottom of the housing assembly (FIG. 4D). The method then places the first and second vessel housing assembly into a centrifuge and operates the centrifuge to form at least one processed fluid, now in the second vessel 2. The sample is centrifuged preferably for fifteen minutes at a speed of 3500 rpm; those numbers can be modified or optimized depending on the type and complexity of a sample.

In preferred embodiments, as above discussed, the housing is cylindrical in shape and receives a standard 20 mL vial. Alternatively, other commercial sample vials or bottles of similar or different dimensions can also be used, e.g., 10 mL vials, 2 nL vials, etc. When a vial of different dimension, size and/or shape, from that of the housing is used, an adapter is implemented to adapt the dimension of the vial to that of the housing so that the vial and the housing can be attached to each other.

Figure 5A:
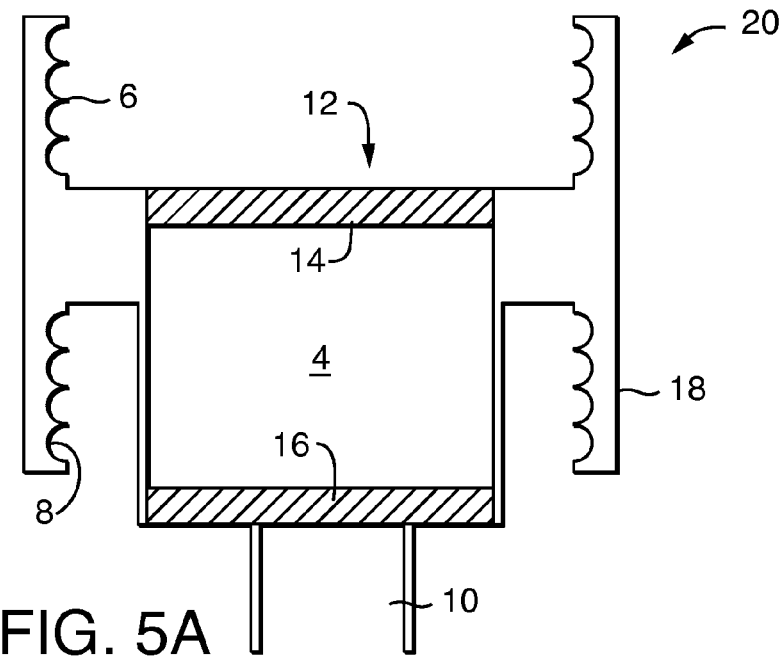
FIGS. 5A-5C are schematic representations of an embodiment of the device made in accordance with the present invention.
Figure 5B:
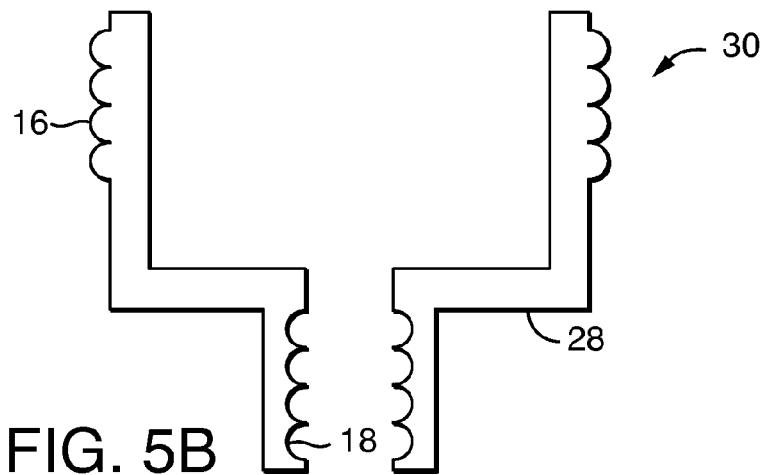
Figure 5C:
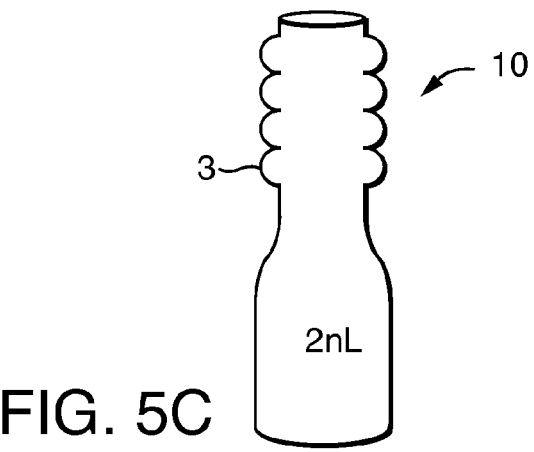

The implementation of an adapter is illustrated in FIGS. 5A-5C. FIG. 5A is a device 20 the same as shown in FIG. 1, which has a housing 18 and a processing component 12. The housing 18 has two vessel connectors 6 and 8, each of which has a set of threads, and a passage 10, defined by the housing 18. The processing component 12 includes a first filter 14, a second filter 16, and a passage chamber 4, which optionally holds a separation medium between the first filter 14 and the second filter 16. The housing 18 is cylindrical in shape and has an inner diameter sized for receiving a standard 20 mL vial.

The vial 10, as shown in FIG. 5C, is 2 nL in volume with a neck 3 having an outer diameter that is much smaller than the inner diameter of the housing 18. To attach such a small vial 10 to the housing 18, an adapter 30, as shown in FIG. 5B, is employed.

The adapter 30 has a first end 16 and a second end 18. The first end 16 has an inner surface that defines an opening for engaging the processing component 12 of the device 20. The first end 16 has an outer threaded surface with a diameter slightly smaller then the inner diameter of the housing 18 so that the first end 16 can be tightened into the housing 18. The second end 18 has an inner surface that defines an opening for receiving the vial 10. The second end 18 has an inner threaded surface with a diameter slightly greater than the outer diameter of the neck 3 of the vial 10 so that the vial 10 can be tightened into the second end 18 of the adapter 30.

While the invention has been shown and described with reference to specific preferred embodiments, it should be understood by those skilled in the art that various changes in form and detail may be made therein without departing from the scope of the invention as defined by the following claims. For example, more than one processing components, containing different separation media, can be combined in the device for processing a sample, depending on application. And, for example, multiple adapters can be stacked for connecting a sample vial to a vessel connecter on the device, depending upon the size and shape of the sample vial used.

What is claimed is:

1. A device for performing one or more processing steps on a sample, said device comprising:
    a housing having a first vessel connector for receiving a first vessel and a second vessel connector for receiving a second vessel, and a passage, to provide fluid communication between said first vessel and said second vessel; and,
    a processing component in fluid communication with said passage, wherein said processing component is a porous monolith separation media or a bed of particles held in between opposing filters; said processing component for effecting a change in at least one fluid moving through said passage to form at least one processed fluid, said first vessel for receiving a first fluid and said second vessel for receiving a processed fluid, and said first fluid moving from said first vessel through said processing component and said passage into said second vessel to form at least one processed fluid via centrifugal force; wherein said bed of particles or monolith separation media are functionalized for ion exchange interactions, carbon affinity, hydrophilic or catalytic interactions.

2. The device of claim 1 wherein said housing is molded plastic form.

3. The device of claim 1 wherein said housing is cylindrical in shape.

4. The device of claim 1 wherein said housing has an interior wall tapered from wide to narrow in the direction toward to said second vessel connector of said housing.

5. The device of claim 1 wherein at least one of said first vessel connector and second vessel connector is constructed and arranged to receive a standard laboratory vial.

6. The device of claim 1 wherein at least one of said first vessel connector and second vessel connector is selected from the group comprising cooperating threads, tightly fitted lips and locking flanges, and cinching bands.

7. The device of claim 1 further comprising one or more adapters for connecting said vessels, different in size and shape from said housing, to said housing.

8. The device of claim 7 wherein each of said one or more adapters comprises a first end and a second end, said first end has one or more interior walls, defining an opening for engaging said processing component, and one or more exterior walls sized so that said first end can be tightened into said housing, and said second end has one or more interior walls, defining an opening for receiving a said vessel and sized so that said second end can be tightened onto a said vessel.

9. The device of claim 8 wherein said first and second ends comprise cooperating threads.

10. The device of claim 1 wherein said processing component is selected from one or more of the group comprising of filters, beds of particles, and porous monolith separation media.

11. The device of claim 10 wherein said filter is selected from the group comprising membranes, screens, and frits.

12. The device of claim 11 wherein said membranes are disk-shaped or ball-shaped.

13. The device of claim 11 wherein said membranes are 2.0 μm in thickness.

14. The device of claim 11 wherein said membranes have a property selected from a group comprising water-repellent property and organic-repellent property.

15. A device for performing one or more processing steps on a sample, said device comprising:
a housing having a first vessel connector for receiving a first vessel and a second vessel connector for receiving a second vessel, and a passage, to provide fluid communication between said first vessel and said second vessel; and
a processing component in fluid communication with said passage, wherein said processing component is a porous monolith separation media or a bed of particles held in between opposing filters; said processing component for effecting a change in at least one fluid moving through said passage to form at least one processed fluid, said first vessel for receiving a first fluid and said second vessel for receiving a processed fluid, and said first fluid moving from said first vessel through said processing component and said passage into said second vessel to form at least one processed fluid via centrifugal force; wherein said bed of particles comprise a sorbent material selected from a group consisting of silica, silica-C18, monolith separation media polymer, reversed phase, ion exchanger, or carbon.

16. The device of claim 15 wherein said processing component is held in said passage by releasable securing means.

17. The device of claim 16 wherein said processing component has at least one securing surface and said passage has at least one passage wall and said releasable securing means comprises a press fit of said securing surface with said at least one passage wall.

18. The device of claim 15 wherein said processing component has at least one processing rim surface constructed and arranged to abut and seal against a cooperation lip of a containment vessel.

19. A device for performing one or more processing steps on a sample, said device comprising:
a housing having a first vessel connector for receiving a first vessel and a second vessel connector for receiving a second vessel, and a passage, to provide fluid communication between said first vessel and said second vessel; and,
a processing component in fluid communication with said passage, said processing component for effecting a change in at least one fluid moving through said passage to form at least one processed fluid, said first vessel for receiving a first fluid and said second vessel for receiving a processed fluid, and said first fluid moving from said first vessel through said processing component and said passage into said second vessel to form at least one processed fluid via centrifugal force; wherein at least one of said first vessel and a second vessel has a interior volume and said passage extends into the interior volume to form a passage chamber; said passage chamber has a first end and a second end and at least one wall, said at least one wall constructed and arranged to hold a first filter at said first end and at least a second filter at said second end; and said passage chamber holds a bed of particles or a monolith separation media in between said first filter and said second filter.

20. The device of claim 19 wherein said sample comprises one or more proteins, peptides glycoproteins, cellulose, poorly solubilized compounds.

21. A method of forming at least one processed fluid from a sample comprising the steps of:
placing said sample in a first vessel;
placing a device having a housing and processing component on said first vessel, said housing having a first vessel connector for receiving a first vessel, a second vessel connector for receiving a second vessel and a passage, said first vessel and said second vessel received on said first vessel connector and said second vessel connector respectively in fluid communication via said passage, said processing component in fluid communication with said passage and for effecting a change in at least one fluid moving through said passage to form at least one processed fluid, and said processing component is a porous monolith separation media or a bed of particles held in between opposing filters; wherein said bed of particles or monolith separation media are functionalized for ion exchange interactions, carbon affinity, hydrophilic or catalytic interactions;
placing a second vessel on said device at said second vessel connector to form a first and second vessel housing assembly;
placing said first and second vessel housing assembly into a centrifuge; and,
operating said centrifuge to form at least one processed fluid.

22. The method of claim 21 wherein said first and second vessel housing assembly is flipped such that said first vessel is on the top of said housing assembly and said second vessel is on the bottom of said housing assembly.

23. The method of claim 21 further comprising a step of using one or more adapters for connecting said vessels, different in sizes and shapes from said housing, to said housing.

24. A kit for performing one or more processing steps on a sample held in a first vessel, said kit comprising
a device having a housing having a first vessel connector and a second vessel connector, and a passage, said first vessel connector for receiving a first vessel and said second vessel connector for receiving a second vessel, and said first vessel and said second vessel received on said first vessel connector and said second vessel connector respectively in fluid communication via said passage; and,
one or more processing components for being placed in fluid communication with said passage, said processing component for effecting a change in at least one fluid moving through said passage to form at least one processed fluid, said first vessel for receiving a first fluid and being connected to said housing via said first vessel connector and said second vessel for receiving a processed fluid from said passage and being connected to said housing via said second vessel connector, and said first fluid moving from said first vessel through said processing component and said passage into said second vessel to form at least one processed fluid via centrifugal force, and said processing component is a porous monolith separation media or a bed of particles held in between opposing filters; wherein said bed of particles or monolith separation media are functionalized for ion exchange interactions, carbon affinity, hydrophilic or catalytic interactions.

25. The kit of claim 24 wherein said one or more processing components comprises a cartridge secured into said passage.

26. The kit of claim 24 further comprising one or more adapters for connecting said vessels, different in sizes and shapes from said housing, to said housing.

* * * * *